(12) United States Patent
Ando et al.

(10) Patent No.: US 8,778,431 B2
(45) Date of Patent: Jul. 15, 2014

(54) NUTRITION-ENRICHED RICE MANUFACTURING METHOD

(76) Inventors: Toshiharu Ando, Gifu (JP); Tsuyako Ando, Gifu (JP)

( * ) Notice: Subject to any disclaimer, the term of this patent is extended or adjusted under 35 U.S.C. 154(b) by 576 days.

(21) Appl. No.: 13/109,613

(22) Filed: May 17, 2011

(65) Prior Publication Data

US 2011/0217438 A1 Sep. 8, 2011

Related U.S. Application Data

(63) Continuation of application No. PCT/JP2009/054993, filed on Mar. 16, 2009.

(51) Int. Cl.
  *A23L 1/182* (2006.01)
  *B65D 81/34* (2006.01)
  *A23L 1/10* (2006.01)

(52) U.S. Cl.
  CPC .. *A23L 1/10* (2013.01); *A23L 1/182* (2013.01)
  USPC ........... 426/412; 426/618; 426/507; 426/520; 426/465

(58) Field of Classification Search
  CPC ......... A23L 1/182; A23L 1/1025; A23L 1/10; B65D 81/3415; B65D 2581/34; B65D 81/343; B65D 81/3446; B65D 81/3461
  USPC ......... 426/618, 627, 465, 466, 507, 508, 520, 426/523
  See application file for complete search history.

(56) References Cited

U.S. PATENT DOCUMENTS 2,358,251 A * 9/1944 Huzenlaub et al. ........... 426/462
2,498,573 A * 2/1950 Ozai-Durrani ................. 426/461
2,746,168 A * 5/1956 Rickabaugh ................... 34/559
3,089,527 A * 5/1963 Wasserman et al. ........... 426/483
3,514,861 A * 6/1970 Satake ............................. 34/505
3,911,594 A * 10/1975 McIntire et al. ................ 34/102
4,086,708 A * 5/1978 Westelaken ..................... 34/65

(Continued)

FOREIGN PATENT DOCUMENTS

JP         10082585 A  *  3/1998  ............... F26B 9/06
JP     2004-000205 A      1/2004

(Continued)

OTHER PUBLICATIONS

Machine Translation of JP2004-000205 published Jan. 8, 2004.*

(Continued)

*Primary Examiner* — Viren Thakur
(74) *Attorney, Agent, or Firm* — Westerman, Hattori, Daniels & Adrian, LLP

(57) ABSTRACT

A nutrition-enriched rice manufacturing method includes a harvesting process of harvesting raw unhulled rice as a starting material from a paddy field, a nutrition enriching process of generating nutrition-enriched unhulled rice by heating the raw unhulled rice of which average moisture content is at a predetermined level of 20% by weight or more with a microwave heating device and heat-retaining the raw unhulled rice for a predetermined period of time with a heat retention device, and a drying, hulling and polishing process of drying nutrition-enriched unhulled rice so as to have an average moisture content suitable to a long-term storage, hulling to remove chaff, and polishing to remove embryo and bran layer so as to obtain nutrition-enriched polished rice which abundantly contains gamma aminobutyric acid in an endosperm part.

5 Claims, 4 Drawing Sheets

(56) References Cited

U.S. PATENT DOCUMENTS

| | | | |
|---|---|---|---|
| 4,361,593 A * | 11/1982 | Brooks et al. | 426/627 |
| 4,479,309 A * | 10/1984 | Tolson | 34/394 |
| 4,784,216 A * | 11/1988 | Bracegirdle et al. | 165/64 |
| 5,277,136 A * | 1/1994 | Davis | 110/347 |
| 6,318,000 B1 * | 11/2001 | Satake et al. | 34/168 |
| 6,398,921 B1 * | 6/2002 | Moraski | 204/157.43 |
| 2006/0263499 A1 | 11/2006 | Satake et al. | |
| 2007/0196559 A1 * | 8/2007 | Fukumori et al. | 426/618 |
| 2011/0271649 A1 * | 11/2011 | Tetzlaff | 53/474 |

FOREIGN PATENT DOCUMENTS

| | | |
|---|---|---|
| JP | 2004-159617 A | 6/2004 |
| JP | 2004-215522 A | 8/2004 |
| JP | 2005-052073 A | 3/2005 |
| JP | 2005-117982 A | 5/2005 |
| JP | 2005-143435 A | 6/2005 |
| JP | 2005-333829 A | 12/2005 |
| JP | 2007-215504 A | 8/2007 |
| JP | 2008-000639 A | 1/2008 |
| JP | 4317258 B1 | 8/2009 |

OTHER PUBLICATIONS

Formal Translation of JP2008-000639 to Miwa, published Jan. 2008.*

International Search Report of PCT/JP2009/054993, date of mailing Apr. 7, 2009.

Y. H. Kim et al; "Study on the Characteristics of far Infrared Ray Drying for Rough Rice (III)" pp. 213-219, 2003.

* cited by examiner

NUTRITION-ENRICHED RICE MANUFACTURING METHOD

This application is a continuation of International Application No. PCT/JP2009/054993, filed on Mar. 16, 2009.

BACKGROUND OF THE INVENTION

1. Field of the Invention

The present invention relates to a method of manufacturing rice which abundantly contains gamma aminobutyric acid in an endosperm part.

2. Description of Related Art

Conventionally, it is said that effects of preventing hypertension and improving blood flow can be obtained by taking gamma aminobutyric acid. Therefore, germinated brown rice and germinated soybean which are foods with an increased content of the gamma aminobutyric acid are generally manufactured. Seeds of rice, soybean, and the like are germinated so that nutrition including gamma aminobutyric acid and vitamin B group is enriched without using additives more than usual.

In the conventional method of manufacturing germinated brown rice, in general, brown rice with embryo is put into a soak tank or the like with water and a water temperature in the soak tank is kept to be substantially 25 to 35° C. by using an electric heater or the like. Then, the brown rice is soaked in the water in the soak tank for 24 to 72 hours so as to be germinated. The brown rice soaked in the water absorbs water and a moisture content of the brown rice is increased. Further, the brown rice is heat-retained at a temperature suitable to germination. Eventually, the brown rice starts to germinate and becomes in a so-called "pigeon breast state". In the pigeon breast state, the embryo grows to a size of substantially 0.5 mm to 2.0 mm so that germination can be observed seemingly. The germinated brown rice obtained in such a manner contains gamma aminobutyric acid abundantly in comparison with that contained in usual brown rice. Brown rice contains only 2 to 3 mg/100 g of gamma aminobutyric acid and polished rice contains only substantially 1 mg/100 g of gamma aminobutyric acid. On the other hand, a content of gamma aminobutyric acid in the germinated brown rice is increased to substantially 5 to 20 mg/100 g.

Further, a technique of manufacturing germinated rice with embryo buds obtained by polishing germinated brown rice while embryo is left and removing bran layer has been commonly known by applying the above technique of manufacturing germinated brown rice (see Patent Document 1). Flavor of the germinated rice with embryo buds is improved in comparison with that of the germinated brown rice by removing the bran layer therefrom.

[Patent Document 1] Japanese Patent Application Laid-open No. 2005-333829

However, in the conventional germinated brown rice and germinated rice with embryo buds, gamma aminobutyric acid is increased in embryo and bran layer. Therefore, if the germinated brown rice or the germinated rice with embryo buds is polished to obtain polished rice, there arises a problem that a content of the gamma aminobutyric acid in the obtained polished rice is decreased to an equivalent level to that of usual polished rice. Therefore, the germinated brown rice or the germinated rice with embryo buds is cooked while embryo and bran layer are left so that the flavor of the germinated brown rice or the germinated rice with embryo buds is poorer than that of polished rice. The flavor thereof can be improved by mixing the germinated brown rice or the germinated rice with embryo buds with usual polished rice and cooking. However, the following problem arises in this case. That is, if the germinated brown rice or the germinated rice with embryo buds which abundantly contains gamma aminobutyric acid is mixed with the polished rice which is poor in gamma aminobutyric acid, a content of the gamma aminobutyric acid by weight in cooked rice is largely decreased.

Further, if brown rice is soaked for a long period of time in order to germinate the brown rice, when the brown rice is dried after being soaked, there arises a problem that so-called "cracking" is easily caused. The cracking is a phenomenon that a surface of brown rice is cracked. The flavor of the cracked rice is bad because a grain of the rice is cracked when polished or texture of the rice becomes sticky when boiled. Further, since bacteria is easily developed in water at a temperature suitable to germination of brown rice, there is a risk that an unusual odor is caused in the brown rice when soaked in the water and the flavor thereof is further deteriorated.

SUMMARY OF THE INVENTION

Technical Problem

In consideration of the above circumstances, an object of the invention is to provide a nutrition-enriched rice manufacturing method by which nutrition-enriched rice which abundantly contains gamma aminobutyric acid even if bran layer and embryo are removed by polishing and which is excellent in flavor.

Solution to Problem

A nutrition-enriched rice manufacturing method according to an aspect of the invention "includes a nutrition enriching process in which unhulled rice in a pre-germinated state of which average moisture content is 20% by weight or higher and 32% by weight or lower is heated to a processing temperature of 52° C. or higher and 80° C. or lower, heat-retained in a range of the processing temperature for a predetermined period of time so as to enrich gamma aminobutyric acid in an endosperm part of the unhulled rice".

A phrase "enrichment" indicates increase in a content of a contained material per unit weight. That is, enrichment of gamma aminobutyric acid in an endosperm part indicates increase in weight of the gamma aminobutyric acid contained in the endosperm part. The enrichment of gamma aminobutyric acid includes a case where the gamma aminobutyric acid is increased in the endosperm part by an action of an enzyme and a case where the gamma aminobutyric acid is moved from embryo or bran layer to the endosperm part so that the content of the gamma aminobutyric acid in the endosperm part is increased.

A phrase "pre-germinated state" indicates a state where rice can germinate when conditions suitable to germination are satisfied but elongation of embryo is not visually observed.

Further, a phrase "nutrition-enriched rice" indicates rice in which gamma aminobutyric acid is enriched at least in an endosperm part while keeping a pre-germinated state by a physiological action such as an enzyme reaction in grain of rice. Hereinafter, unhulled rice and brown rice in which gamma aminobutyric acid is enriched by the above nutrition enriching process and rice polished after the nutrition enriching process are collectively referred to as "nutrition-enriched rice". In particular, polished rice having such characteristic is referred to as "nutrition-enriched polished rice".

A phrase "average moisture content" indicates a wet-based average moisture content. That is, the "average moisture content" is a ratio of a weight of water with respect to a total weight containing water. Hereinafter, when a moisture content of unhulled rice is referred, the expression indicates a moisture content in a state of brown rice obtained by removing chaff from the unhulled rice.

A phrase "processing temperature" indicates a heating temperature in the nutrition enriching process according to the aspect of the invention and is a temperature of 52° C. or higher and 80° C. or lower which is higher than a temperature range where unhulled rice can germinate. It is to be noted that an optimum temperature where unhulled rice germinates is known to be 30° C. to 34° C. and a maximum temperature where unhulled rice germinates is known to be 40 to 44° C.

With the nutrition-enriched rice manufacturing method according to the aspect of the invention; after unhulled rice as a starting material of which average moisture content is 20% by weight or higher is heated to a processing temperature of 52° C. or higher and 80° C. or lower in the air, the unhulled rice is heat-retained for a predetermined period of time. Therefore, a physiological action such as enzyme reaction in grain of rice can be activated so that nutrition-enriched rice of which content of gamma aminobutyric acid in an endosperm part is enriched can be manufactured. In a case of the conventional germinated brown rice, gamma aminobutyric acid is hardly enriched in the endosperm part. In contrast, in the nutrition-enriched rice manufactured by the nutrition-enriched rice manufacturing method according to the aspect of the invention, the gamma aminobutyric acid is enriched in the endosperm part. Accordingly, nutrition-enriched polished rice which abundantly contains gamma aminobutyric acid can be provided.

Further, according to the aspect of the invention, unlike the conventional germinated brown rice manufacturing method, a content of gamma aminobutyric acid in grain of rice can be enriched in a processing in the air without soaking or spraying for germination. An unusual odor due to development of bacteria can be prevented from being caused and deterioration in flavor of rice can be prevented by eliminating soaking and spraying.

In the aspect of the invention, when an average moisture content of unhulled rice is 20% by weight or higher, an effect can be obtained. In order to obtain more significant effect, the average moisture content is desirably 23% by weight or higher. As the moisture content is lower, enrichment of gamma aminobutyric acid becomes slower. However, in general, it is difficult to make unhulled rice absorb water until an average moisture content thereof becomes 32% by weight or higher. Therefore, in the aspect of the invention, unhulled rice of which average moisture content is 20 to 32% by weight is used as a starting material.

In addition, a soaking time of substantially 24 to 72 hours is conventionally required for manufacturing germinated brown rice. However, with the nutrition-enriched rice manufacturing method according to the aspect of the invention, since the nutrition enriching process is performed in the air, a facility such as a soak tank can be eliminated. Therefore, a content of gamma aminobutyric acid contained in rice can be enriched with more simple facility.

Cracking is easily caused if brown rice is dried. However, with the nutrition-enriched rice manufacturing method according to the aspect of the invention, rice with chaff is dried so as to moderate change of a moisture content in accompanied with the drying and suppress the cracking from being caused.

If a processing temperature in the nutrition enriching process is lower than 52° C., speed of enzyme reaction is significantly slower so that an efficiency of the nutrition enriching process is deteriorated. On the other hand, if the processing temperature in the nutrition enriching process is higher than 80°, inactivation due to thermal denaturation of an enzyme contained in unhulled rice as a starting material is rapidly advanced. This causes a risk that the unhulled rice cannot be nutrition-enriched. Accordingly, the processing temperature in the nutrition enriching process is preferably in a range of 52 to 80° C.

As a heating method in the nutrition enriching process, any method can be employed and configuration is not limited as long as the unhulled rice in the air can be heated to a temperature required for a processing of the aspect of the invention. For example, a method utilizing an electrical heater, a gas heater, a kerosene heater, a tank including an air conditioning facility for maintaining high temperature and high humidity state, a microwave heating device, a far infrared ray heating device, a thermal storage tank or the like can be employed.

Further, as a heat retention method in the nutrition enriching process, any method can be employed as long as unhulled rice in the air can be heat-retained at a predetermined temperature. For example, a method of heat-retaining the unhulled rice in the same manner as the above heating method or a heat-retention container for heat-retaining the unhulled rice with heat insulation property of the container can be employed.

Further, in the nutrition-enriched rice manufacturing method according to the aspect of the invention, it is preferable that "the unhulled rice in the pre-germinated state be raw unhulled rice of which average moisture content is kept to be 20% by weight or higher and 32% by weight or lower from harvesting to the nutrition enriching process."

Unhulled rice harvested in a paddy field is normally dried with a grain dryer or the like so as to have a water content suitable to storage soon after the harvesting. An average moisture content of the unhulled rice which is dried and stored in a silo or the like is generally 14 to 16% by weight. In contrast, "raw unhulled rice" indicates unhulled rice kept in a state where the average moisture content thereof is 20% by weight or higher after being harvested in a paddy field. The "raw unhulled rice" contains a large amount of water and is somewhat soft. Hereinafter, unhulled rice which is dried so as to have an average moisture content of less than 20% by weight is referred to as "dried unhulled rice".

The raw unhulled rice is desirably unhulled rice immediately after harvested, which abundantly contains water. However, the raw unhulled rice may have been stored in a low-temperature storage or the like while preventing the unhulled rice from being dried. If raw unhulled rice is used as a starting material, a conventional procedure of hydrating the unhulled rice again, which has been once dried with a dryer, can be eliminated. Further, cracking in accompanied with hydration can be prevented from being caused.

Further, the nutrition-enriched rice manufacturing method according to the aspect of the invention may "further include a hydration process in which water is added to the unhulled rice in the pre-germinated state before the nutrition enriching process."

In general, an average moisture content of the dried unhulled rice is substantially 14 to 16% by weight. With the nutrition-enriched rice manufacturing method according to the aspect of the invention, such unhulled rice having a low moisture content is hydrated by soaking or the like so as to increase the average moisture content thereof to 20% by weight or higher. Then, the obtained unhulled rice is used as a starting material of nutrition-enriched rice. Therefore, nutrition-enriched rice can be manufactured from a starting material which has been dried and stored for a long period of time.

A method of adding water to unhulled rice in the hydration process is not particularly limited. For example, various methods such as soaking of the unhulled rice in water, spraying onto the unhulled rice and placement of the unhulled rice under high-humidity environment can be employed.

Further, the nutrition-enriched rice manufacturing method according to the aspect of the invention, it is preferable that "the hydration process have at least one of a low-temperature soaking process in which the unhulled rice in the pre-germinated state is soaked in water at higher than 0° C. and 10° C. or lower and a high-temperature soaking process in which the unhulled rice in the pre-germinated state is soaked in water of 45° C. or higher and lower than 52° C."

In general, a maximum temperature where unhulled rice can germinate is 40 to 44° C., a minimum temperature where unhulled rice can germinate is 10 to 13° C. In the above soaking process, unhulled rice is soaked in water at a temperature of 10° C. or lower, which is lower than the minimum temperature suitable to germination of unhulled rice, or at a temperature of 45° C. or higher, which is higher than the maximum temperature, thereby increasing a moisture content of the unhulled rice without germinating the unhulled rice. With this, water is added to unhulled rice so as to have a water content required for the nutrition enriching process while preventing embryo from being elongated and suppressing a risk that nutrition in grain of rice is consumed by the embryo.

As in the conventional germinated brown rice manufacturing method, if soaking is performed in a temperature range of substantially 25° C. to 35° C. suitable to germination, development of bacteria is advanced to generate unusual odor and cause deterioration in the flavor. Therefore, the conventional germinated brown rice has been bad in flavor and has not been eaten by preference. In addition, a sterilize processing such as high temperature steam exposure or ultraviolet irradiation has been required in order to prevent bacteria from being developed.

On the other hand, in the above soaking process, bacteria is suppressed from being developed because soaking is performed at a low temperature of 10° C. or lower or a high temperature of 45° C. or higher. Therefore, the above sterilizing processing is eliminated so as to reduce manufacturing cost. It is to be noted that if water temperature in the low-temperature soaking process is 0° C. or lower, there arises a risk that unhulled rice is frozen. Therefore, the water temperature of 0° C. or lower is not appropriate. Further, if the unhulled rice is soaked at a high temperature, rice is color-changed to brown or unusual odor is generated in some case. Therefore, a water temperature of 52° C. or higher in the high-temperature soaking process is not appropriate because a risk that the color change is caused and unusual odor is generated is increased.

Further, in the nutrition-enriched rice manufacturing method according to the aspect of the invention, it is preferable that "the hydration process be executed such that each of the low-temperature soaking process and the high-temperature soaking process is executed at least one time."

With the above configuration, since the low-temperature soaking process and the high-temperature soaking process are performed in combination, absorption of water by the unhulled rice is faster than that in a case where the low-temperature soaking process is simply performed because the high-temperature soaking process is included. Therefore, a soaking time until an average moisture content of the unhulled null reaches to a predetermined average moisture content is made shorter. Further, with the above configuration, the average moisture content is made higher by the low-temperature soaking process in comparison with that in a case where the high-temperature soaking process is simply performed. Therefore, a soaking time in the high-temperature soaking process is also made shorter. By making the soaking time in the high-temperature soaking process shorter, a risk that color change and generation of unusual odor is caused on rice in accompanied with the soaking at a high temperature can be suppressed. Accordingly, the soaking time can be made relatively short while preventing color change and generation of unusual odor on rice from being caused.

It is to be noted that the order of the low-temperature soaking process and the high-temperature soaking process is not limited and either of which may be performed first. Further, the low-temperature soaking process and the high-temperature soaking process may be alternately performed a plurality of times.

Effect of Invention

As described above, with the nutrition-enriched rice manufacturing method according to the invention, gamma aminobutyric acid in an endosperm part of unhulled rice can be enriched for a relatively short period of time with a nutrition enriching process of heating unhulled rice as a starting material in the air, thereby manufacturing nutrition-enriched rice which is excellent in flavor and abundantly contains gamma aminobutyric acid even if bran layer and embryo are removed by polishing.

DETAILED DESCRIPTION OF THE INVENTION

Figure 1:
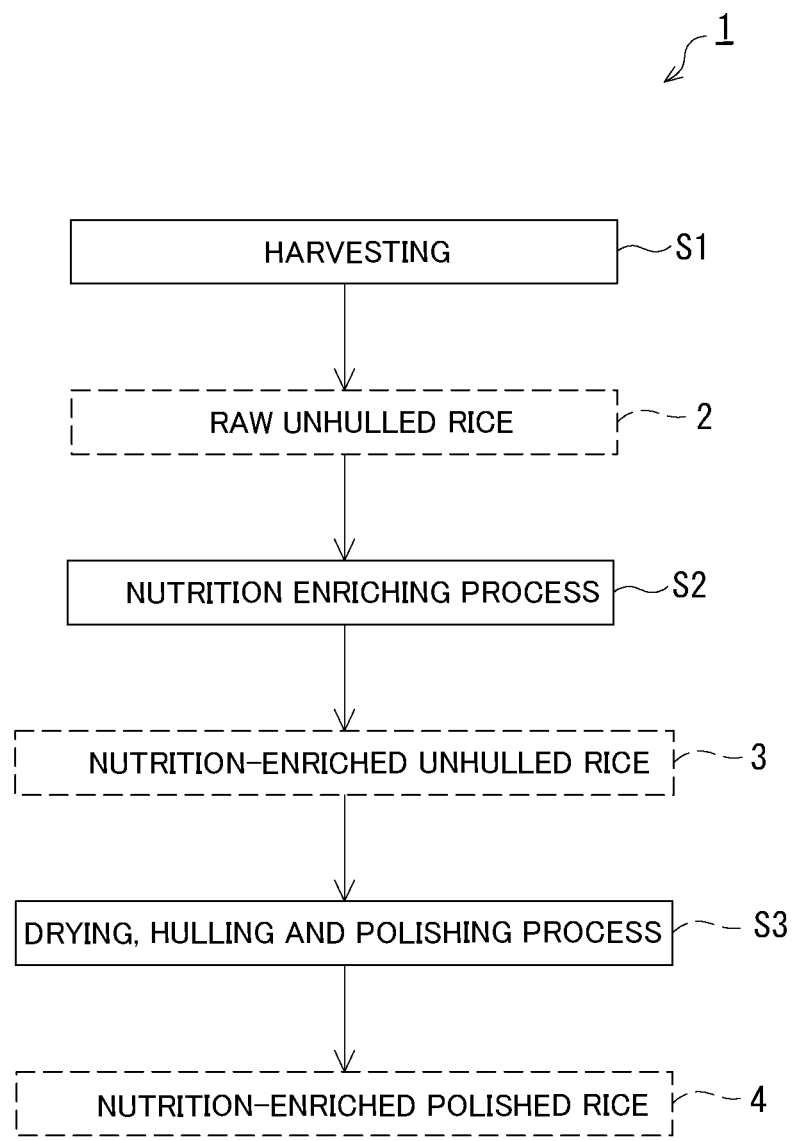
FIG. 1 is a descriptive view illustrating a nutrition-enriched rice manufacturing method according to the invention.
Figure 2:
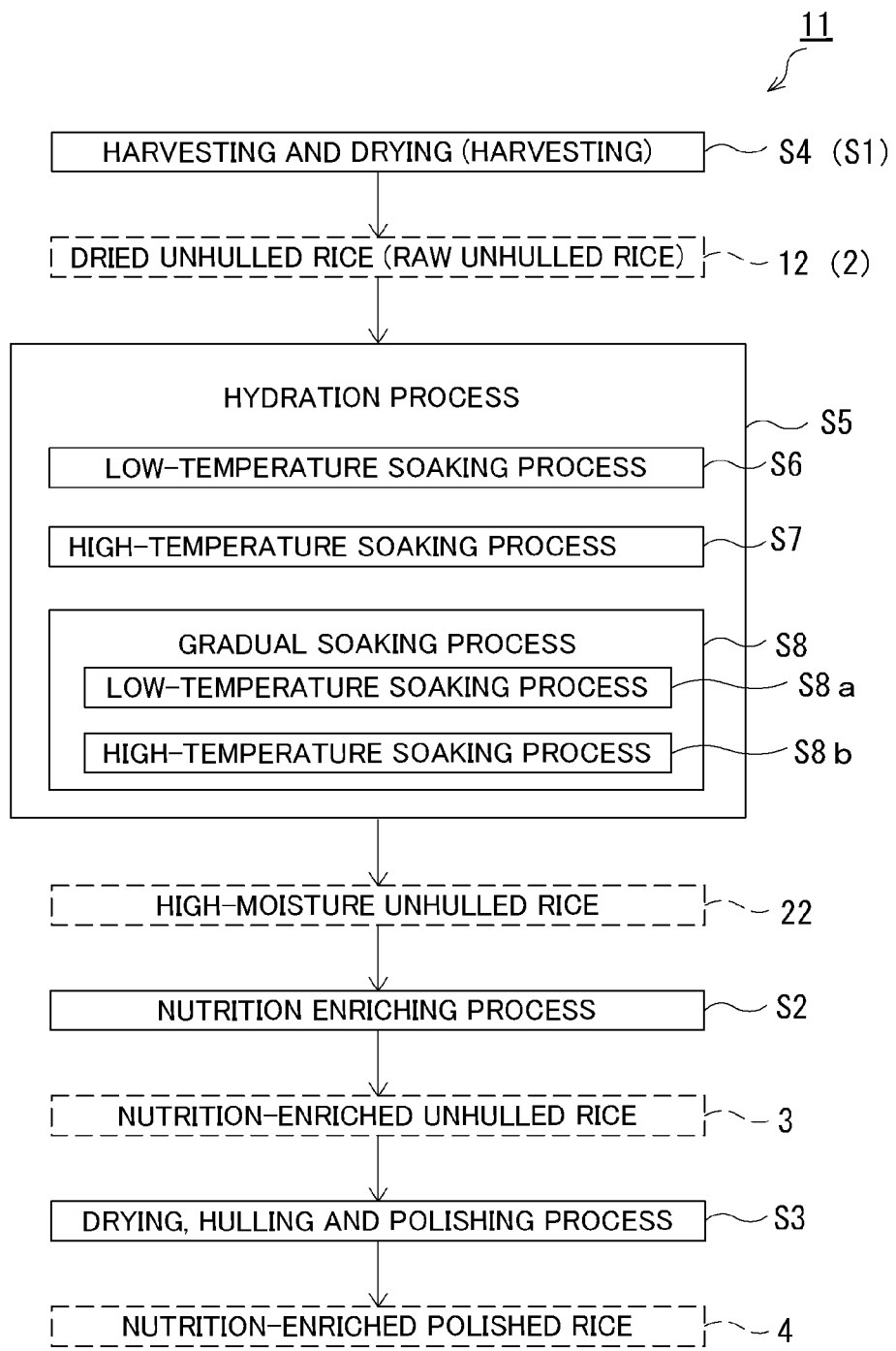
FIG. 2 is a descriptive view illustrating the nutrition-enriched rice manufacturing method having a hydration process.

Hereinafter, one embodiment of a nutrition-enriched rice manufacturing method according to the invention is described with reference to FIG. 1 and FIG. 2. FIG. 1 is a descriptive view illustrating a nutrition-enriched rice manufacturing method 1 in a case when raw unhulled rice 2 is used as a starting material. FIG. 2 is a descriptive view illustrating a nutrition-enriched rice manufacturing method 11 having a hydration process S5.

In the nutrition-enriched rice manufacturing method 1, at first, rice is harvested in a paddy field by a combine harvester or the like (harvesting process S1) so as to obtain raw unhulled rice 2 to be a starting material. The raw unhulled rice 2 immediately after harvested is normally in a high-moisture state in which an average moisture content thereof is substantially 23 to 28% by weight. Prior to the following processes, chaff of some raw unhulled rice 2 which has been taken out as a sample is removed. Then, a moisture content thereof is measured in a state of brown rice and it is checked that an average moisture content of the raw unhulled rice 2 is 20% by weight or higher, which is suitable to a nutrition enriching process S2. Note that the raw unhulled rice 2 corresponds to pre-germinated unhulled rice according to the invention.

Next, the raw unhulled rice 2 of which average moisture content is 20% by weight or higher is heated to 63° C. by a commonly used microwave heating device of which maximum output power is 1.4 kw. The heated raw unhulled rice 2 is put into a plastic container and the container is quickly sealed in order to prevent the raw unhulled rice 2 from being dried. Then, the container is accommodated in a water tank as a heat retention device and is heat-retained at 63° C. for 60 minutes (nutrition enriching process S2). Note that a temperature in the heat retention device can be adjusted.

With the nutrition enriching process S2, gamma aminobutyric acid is enriched particularly in an endosperm part of the raw unhulled rice 2 as a starting material so as to obtain nutrition-enriched unhulled rice 3. The nutrition-enriched unhulled rice 3 is in a pre-germinated state seemingly and contains substantially 20 mg/100 g of gamma aminobutyric acid in the endosperm part.

Subsequently, the nutrition-enriched unhulled rice 3 is dried with a commonly used grain dryer so that the water content thereof is decreased to substantially 14 to 16% by weight. Then, the nutrition-enriched unhulled rice 3 is hulled to remove chaff. The obtained rice is further polished to remove embryo and bran layer and only the endosperm part is left. With this, nutrition-enriched polished rice 4 which contains substantially 20 mg/100 g of gamma aminobutyric acid can be obtained (drying, hulling and polishing process S3). Note that the nutrition-enriched unhulled rice 3 and the nutrition-enriched polished rice 4 correspond to nutrition-enriched rice according to the invention.

Further, the nutrition-enriched rice manufacturing method 11 of manufacturing the nutrition-enriched polished rice 4 by using dried unhulled rice 12 is described with reference to FIG. 2. With the nutrition-enriched rice manufacturing method 11, the dried unhulled rice 12 of which average moisture content is decreased is mainly used as a starting material. For example, the dried unhulled rice 13 is obtained by drying the raw unhulled rice 2, which has been harvested in a paddy field (seem FIG. 1) with the grain dryer so as to have an average moisture content of substantially 14 to 16% by weight after harvested (harvesting and drying process S4). Note that the dried unhulled rice 12 corresponds to pre-germinated unhulled rice according to the invention.

In the nutrition-enriched rice manufacturing method 11, the dried unhulled rice of which average moisture content is decreased is used as a starting material. Therefore, prior to the nutrition enriching process S2, the dried unhulled rice 12 is hydrated by a gradual soaking process S8 so as to increase the average moisture content thereof. The gradual soaking process S8 is one type of the hydration process S5. The gradual soaking process S8 is proceeded such that after a low-temperature soaking process S8a is performed, a high-temperature soaking process S8b is performed. In the low-temperature soaking process S8a, the dried unhulled rice 12 is soaked in water at 7° C. for 6 hours. In the high-temperature soaking process S8b, the dried unhulled rice 12 is soaked in water at 50° C. for 1 hour. With the gradual soaking process S8, the dried unhulled rice 12 is made to be high-moisture unhulled rice 22 of which average moisture content is 20% by weight or higher.

As the hydration process S5, the gradual soaking process S8, the low-temperature soaking process S6, or the high-temperature soaking process S7 is selectively performed depending on variety and state of a starting material and other several conditions relating to manufacturing. When a starting material containing a relatively large amount of water, such as a starting material of which average moisture content is 18% by weight, is used, the high-temperature soaking process S7 is selected. On the other hand, when a starting material containing a relatively small amount of water, such as a starting material of which average moisture content is 14% by weight, is used, the low-temperature soaking process S6 or the gradual soaking process S8 is selected. When the low-temperature soaking process S6 is selected, the dried unhulled rice 12 is soaked in water at 7° C. for 24 hours. When the high-temperature soaking process S7 is selected, the dried unhulled rice 12 is soaked in water at 50° C. for 2 hours.

As is described more in detail, with the low-temperature soaking process S6, the dried unhulled rice 12 is soaked at a low temperature of 10° C. or lower so that development of bacteria and color change of rice can be suppressed even if the dried unhulled rice is soaked for a long period of time. On the other hand, with the high-temperature soaking process S7, the dried unhulled rice 12 is soaked at a high temperature of 45° or higher so that water can be quickly absorbed by the dried unhulled rice 12 so as to increase the moisture content thereof. Further, with the gradual soaking process S8, the low-temperature soaking process S8a and the high-temperature soaking process S8b are performed in combination so that a required time until the average moisture content of the dried unhulled rice 12 reaches to 20% by weight can be made shorter than that in the low-temperature soaking process S6.

The high-moisture unhulled rice 22 is generated by a processing of the hydration process S5 so that a nutrition enriching processing can be performed by the nutrition enriching process S2. Since processings subsequent to the nutrition enriching process S2 in the nutrition-enriched rice manufacturing method 11 are the same as those in the nutrition-enriched rice manufacturing method 1, detail description is not repeated.

As described above, with the above nutrition-enriched rice manufacturing methods 1, 11, a physiological action in grain of rice can be activated within a short period of time so that nutrition-enriched polished rice 4 of which content of gamma aminobutyric acid in the endosperm part is increased to 15 to 20 mg/100 g can be manufactured.

Further, with the nutrition-enriched rice manufacturing methods 1, 11, the nutrition-enriched polished rice 4 which abundantly contains gamma aminobutyric acid can be manufactured without soaking and spraying processes which have been essentially required for germination in the conventional germinated brown rice. Further, with the nutrition-enriched rice manufacturing methods 1, 11, unusual odor due to development of bacteria can be prevented from being generated so as to prevent deterioration in the flavor of rice. In particular, with the nutrition-enriched rice manufacturing method 1, when the raw unhulled rice 2 is made to be the nutrition-enriched polished rice 4, soaking is not required to be performed at all.

With the nutrition-enriched rice manufacturing method 1, a drying operation which is normally performed after harvested can be eliminated by using the raw unhulled rice 2 as a starting material. Since the drying operation is not required, time and energy for transporting to a drying facility and drying can be saved so as to reduce manufacturing cost.

On the other hand, with the nutrition-enriched rice manufacturing method 11, the dried unhulled rice 12 can be stored at a normal temperature for a long period of time. Therefore, the nutrition-enriched polished rice 4 can be manufactured throughout the year.

Further, with the nutrition-enriched rice manufacturing method 11, the dried unhulled rice 12 can be made to be the high-moisture unhulled rice 22 without germinating by soaking the dried unhulled rice 12 at a temperature of 10° C. or lower, which is lower than a minimum temperature suitable to germination of unhulled rice, or at a temperature of 45° C. or higher, which is higher than a maximum temperature.

Figure 3:
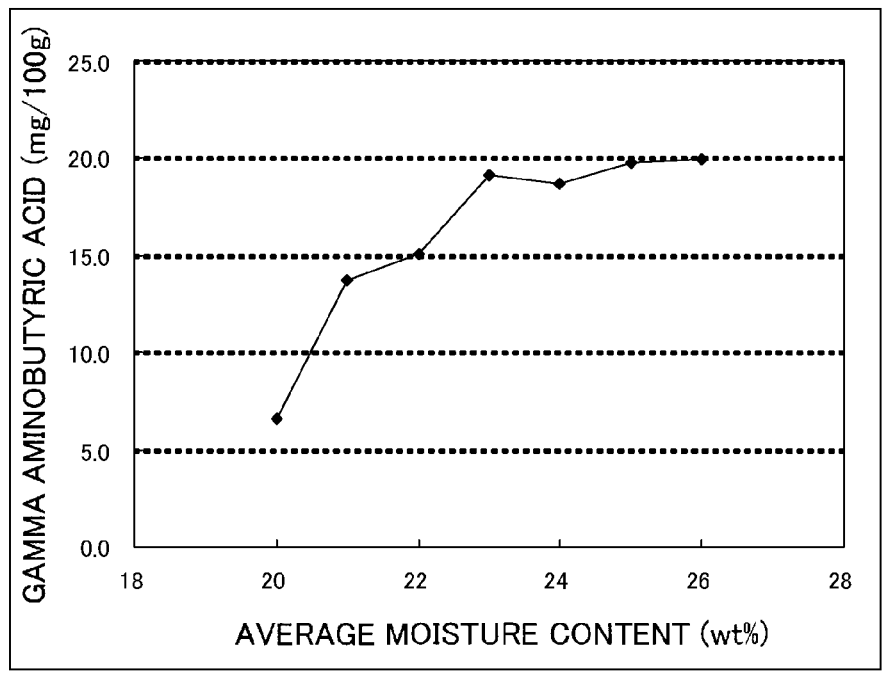
FIG. 3 is a graph illustrating a relationship between an average moisture content of unhulled rice and enrichment of gamma aminobutyric acid based on an experimental result of an experiment 3.
Figure 4:
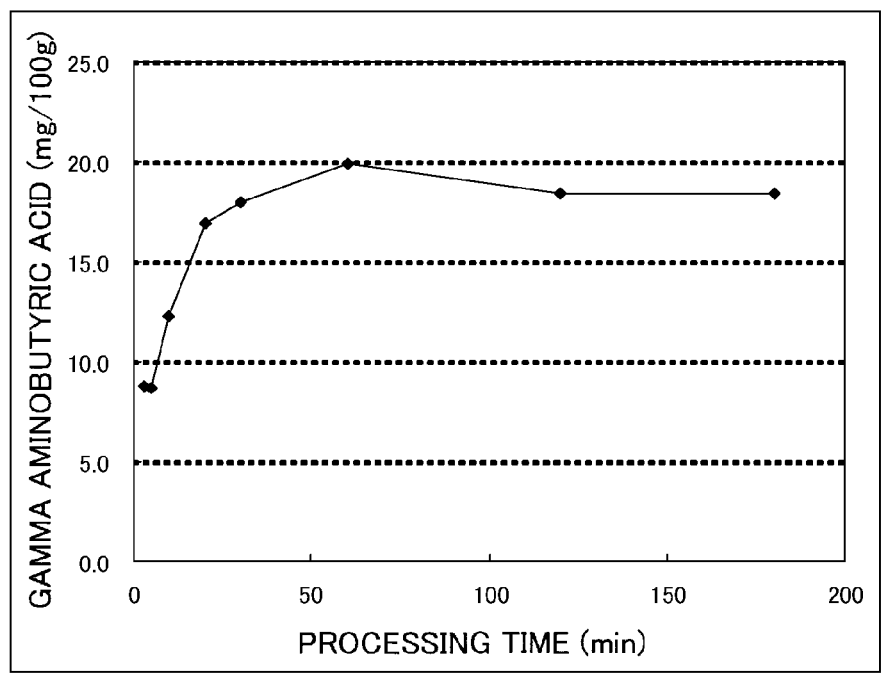
FIG. 4 is a graph illustrating a relationship between a processing time in a nutrition enriching process and enrichment of gamma aminobutyric acid based on an experimental result of an experiment 6.
Figure 5:
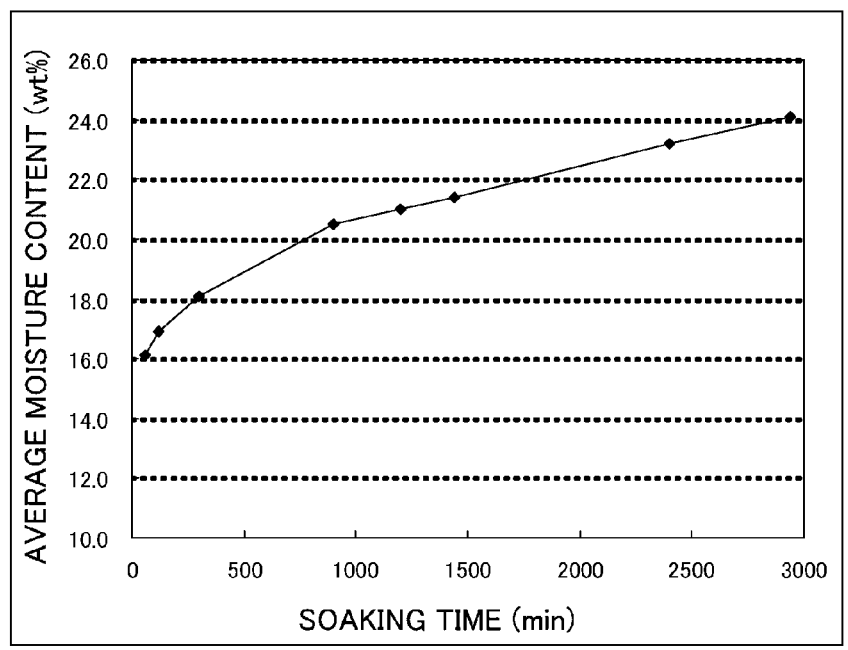
FIG. 5 is a graph illustrating a relationship between a soaking time in a low-temperature soaking process and an average moisture content of unhulled rice based on an experimental result of an experiment 11.
Figure 6:
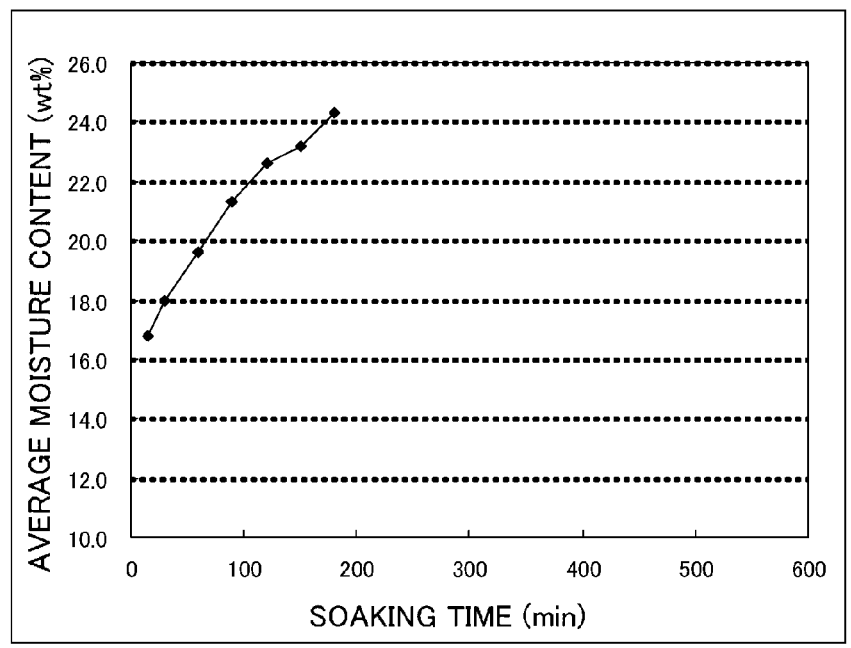
FIG. 6 is a graph illustrating a relationship between a soaking time in a high-temperature soaking process and an average moisture content of unhulled rice based on an experimental result of an experiment 12.

Hereinafter, experiments relating to manufacturing of the nutrition-enriched rice are described in detail with reference to Table 1 to Table 10 and FIG. 3 to FIG. 6. Further, bases relating to the nutrition-enriched rice manufacturing method according to the invention are illustrated with the experiments. FIG. 3 is a graph illustrating a relationship between an average moisture content of unhulled rice and enrichment of gamma aminobutyric acid based on an experimental result of an experiment 3. FIG. 4 is a graph illustrating a relationship between a processing time in the nutrition enriching process and enrichment of gamma aminobutyric acid based on an experimental result of an experiment 6. FIG. 5 is a graph illustrating a relationship between a soaking time in a low-temperature soaking process and an average moisture content of unhulled rice based on an experimental result of an experiment 11. FIG. 6 is a graph illustrating a relationship between a soaking time in a high-temperature soaking process and an average moisture content of unhulled rice based on an experimental result of an experiment 12.

It is to be noted that in the following experiments, any unhulled rice used as a starting material is harvested on 2008 and a variety thereof is Koshihikari in principle unless otherwise specified. Further, a content of gamma aminobutyric acid is a measurement value in a state of polished rice, which is obtained by drying raw unhulled rice so as to have an average moisture content of substantially 15% by weight, and then, removing chaff, embryo and bran layer unless otherwise specified. However, only when specially noted to be brown rice, the content of gamma aminobutyric acid indicates a measurement value in a state of brown rice with embryo and bran layer.

Further, unless otherwise specified, in the nutrition enriching process, unhulled rice as a starting material was put into a plastic bag and the plastic bag was sealed so as to be in an airtight state. Then, the unhulled rice in the plastic bag was heated by a commonly used microwave heating device of which maximum output power is 1.4 kw. The heating was finished when a temperature of the unhulled rice in the plastic bag was increased to a predetermined temperature by the heating. Thereafter, the unhulled rice in the sealed plastic bag was quickly put into a soak tank with water at a predetermined temperature and was heat-retained for a predetermined period of time. After the heat retention was finished, the unhulled rice was taken out from the bag and cooled by winding the unhulled rice with a fan. It is to be noted that time required for increasing the temperature at the time of the heating was slightly different depending on experiment conditions in a range of substantially 3 to 5 minutes. Hereinafter, the heating temperature in the experiments is referred to as "processing temperature" and a time from the starting of heat retention to the end thereof is referred to as "processing time". Further, unless otherwise specified, the heating temperature and the heat retention temperature was the same. Further, in each experiment, the processing temperature was 63° C. and the processing time was 60 minutes.

An average moisture content of a sample was measured by using a commonly used direct current electrical resistance grain moisture meter (manufactured by Shizuoka Seiki Co., Ltd. CTR200E) sold at market. Further, a content of gamma aminobutyric acid in a sample was analyzed in Japan Food Research Laboratories. A temperature of a sample and a water temperature were measured by a commonly used electronic thermometer (manufactured by Sato Keiryoki Mfg Co., Ltd SK-1250MC3α) sold at market.

Hereinafter, an experiment 1 is described based on Table 1. In the experiment 1, it was examined that gamma aminobutyric acid was enriched in an endosperm part of unhulled rice by the nutrition-enriched rice manufacturing method according to the invention. An example 1 in the experiment 1 was nutrition-enriched polished rice obtained from nutrition-enriched unhulled rice. The nutrition-enriched unhulled rice was obtained by nutrition-enriching raw unhulled rice as a starting material of which average moisture content was 26% by weight. On the other hand, a comparative example 1 was normal polished rice, and a comparative example 2 was normal brown rice with embryo and bran layer. Both of the comparative example 1 and the comparative example 2 were not subjected to a processing by the nutrition enriching process. A content of gamma aminobutyric acid of the example 1 was 20.0 mg/100 g and was increased by substantially 16.7 times as that of the polished rice as the comparative example 1 and by substantially 5.4 times as that of the brown rice as the comparative example 2. As described above, the content of gamma aminobutyric acid in the endosperm part could be significantly enriched with the nutrition-enriched rice manufacturing method according to the invention.

TABLE 1

| SAMPLE | GAMMA AMINOBUTYRIC ACID (mg/100 g) |
|---|---|
| EXAMPLE 1 | 20.0 |
| COMPARATIVE EXAMPLE 1 (POLISHED RICE) | 1.2 |
| COMPARATIVE EXAMPLE 2 (BROWN RICE) | 3.7 |

Subsequently, an experiment 2 is described with reference to Table 2. In the experiment 2, a processing temperature and a processing time in the nutrition enriching process were variously changed and enrichment of gamma aminobutyric acid under each experimental condition was examined. For each of examples 2 to 7, unhulled rice of which average moisture content was 26 to 27% by weight was used as a starting material. As seen from results of the examples 2 to 7, the content of gamma aminobutyric acid could be enriched to 8 mg/100 g or more in a range of the processing temperature of 52 to 63° C. and a processing time of 3 to 720 minutes.

TABLE 2

| SAMPLE | AVERAGE MOISTURE CONTENT (wt %) | PROCESSING TEMPERATURE (° C.) | PROCESSING TIME (min) | GAMMA AMINOBUTYRIC ACID (mg/100 g) |
|---|---|---|---|---|
| EXAMPLE 2 | 27 | 52 | 480 | 15.5 |
| EXAMPLE 3 | 27 | 52 | 720 | 18.2 |
| EXAMPLE 4 | 26 | 56 | 120 | 12.1 |
| EXAMPLE 5 | 26 | 58 | 20 | 10.4 |

TABLE 2-continued

| SAMPLE | AVERAGE MOISTURE CONTENT (wt %) | PROCESSING TEMPERATURE (° C.) | PROCESSING TIME (min) | GAMMA AMINOBUTYRIC ACID (mg/100 g) |
|---|---|---|---|---|
| EXAMPLE 6 | 26 | 60 | 10 | 10.1 |
| EXAMPLE 7 | 27 | 63 | 3 | 8.8 |

Next, an experiment 3 is described with reference to Table 3 and FIG. 3. In the experiment 3, a relationship between an average moisture content of raw unhulled rice as a starting material and enrichment of gamma aminobutyric acid by the nutrition enriching process was examined. As a result of the experiment 3, as the average moisture content was increased, the content of gamma aminobutyric acid was enriched. In particular, the content of gamma aminobutyric acid could be significantly enriched until the average moisture content reached to 23% by weight.

TABLE 3

| AVERAGE MOISTURE CONTENT (wt %) | GAMMA AMINOBUTYRIC ACID (mg/100 g) |
|---|---|
| 20 | 6.6 |
| 21 | 13.7 |
| 22 | 15.1 |
| 23 | 19.1 |
| 24 | 18.7 |
| 25 | 19.8 |
| 26 | 20.0 |

Subsequently, an experiment 4 is described with reference to Table 4. In the experiment 4, a relationship between an average moisture content of dried unhulled rice as a starting material and enrichment of gamma aminobutyric acid was examined. The average moisture content of the dried unhulled rice as the starting material was 15% by weight in an initial state. The dried unhulled rice was soaked in water at a temperature of substantially 6° C. for 13 to 24 hours so as to increase the average moisture content thereof to 20 to 22% by weight. Thereafter, the dried unhulled rice was processed by the nutrition enriching process so as to obtain nutrition-enriched rice. As a result of the experiment 4, in a case of the dried unhulled rice of which average moisture content was increased, the content of gamma aminobutyric acid was also increased as the average moisture content at the time of the nutrition enriching process was increased, as in the case of the raw unhulled rice.

TABLE 4

| AVERAGE MOISTURE CONTENT (wt %) | GAMMA AM1NOBUTYRIC ACID (mg/100 g) |
|---|---|
| 20 | 10.4 |
| 21 | 11.9 |
| 22 | 12.3 |

Next, an experiment 5 is described with reference to Table 5. In the experiment 5, raw unhulled rice of which average moisture content was 27% by weight was used as a starting material and a relationship between a processing temperature in the nutrition enriching process and enrichment of gamma aminobutyric acid was examined. The processing temperature in the experiment 5 was in a range of 60 to 80° C. and the processing time was 60 minutes in any cases. In the experiment 5, the content of gamma aminobutyric acid was enriched to 6 mg/100 g or higher in all the samples. A sample which was nutrition-enriched at a processing temperature of 63° C. had the highest content of gamma aminobutyric acid. Further, it was observed that as the processing temperature become higher than 63° C., the content of gamma aminobutyric acid tended to decrease. The reason can be considered as follows. That is, in the nutrition enrichment at a high temperature of higher than 63° C., an enzyme in rice grain was rapidly inactivated and reaction became poor before the nutrition enrichment is sufficiently advanced.

TABLE 5

| PROCESSING TEMPERATURE (° C.) | GAMMA AMINOBUTYRIC ACID (mg/100 g) |
|---|---|
| 60 | 15.9 |
| 63 | 19.9 |
| 68 | 14.2 |
| 73 | 13.7 |
| 80 | 6.6 |

Next, an experiment 6 is described with reference to Table 6 and FIG. 4. In the experiment 6, raw unhulled rice was used as a starting material and a relationship between a processing time in the nutrition enriching process and enrichment of gamma aminobutyric acid was examined. The average moisture content of the starting material was 27% by weight and the processing temperature of the nutrition enriching process was 63° C. in any cases. As a result of the experiment 6, the content of gamma aminobutyric acid in the endosperm part was increased to 8.8 mg/100 g even with a processing time of 3 minutes. Further, it was observed that as the processing time was longer, the gamma aminobutyric acid tended to increase.

TABLE 6

| PROCESSING TIME (min) | GAMMA AMINOBUTYRIC ACID (mg/100 g) |
|---|---|
| 3 | 8.8 |
| 5 | 8.7 |
| 10 | 12.3 |
| 20 | 16.9 |
| 30 | 18.0 |
| 60 | 19.9 |
| 120 | 18.4 |
| 180 | 18.4 |

Next, an experiment 7 is described with reference to Table 7. In the experiment 7, dried unhulled rice was used as a starting material and a relationship between the processing time in the nutrition enriching process and enrichment of gamma aminobutyric acid was examined. The starting material used in the experiment 7 was dried unhulled rice of which average moisture content was 15% by weight in any cases. The dried unhulled rice was soaked in water at 5° C. for 48 hours, and then, further soaked in water at 45° C. for 2 hours so as to increase the average moisture content to 27% by weight. Thereafter, the dried unhulled rice was subjected to the nutrition enriching process at a processing temperature of 63° C. As a result of the experiment 7, it was observed that as the processing time was longer, the gamma aminobutyric acid tended to increase.

TABLE 7

| PROCESSING TIME (min) | GAMMA AMINOBUTYRIC ACID (mg/100 g) |
|---|---|
| 180 | 16.1 |
| 300 | 17.3 |
| 480 | 17.5 |

Next, an experiment 8 is described with reference to Table 8. In the experiment 8, a relationship between hydration method in the hydration process and enrichment of gamma aminobutyric acid in the nutrition enriching process was examined. Dried unhulled rice of which average moisture content was 15% by weight was used as a starting material in any cases. The average moisture content of the unhulled rice as a starting material was increased to 23 to 26% by weight by the low-temperature soaking process for an example 8, by the high-temperature soaking process for an example 9 and by the gradual soaking process for examples 10 and 11. Thereafter, the obtained unhulled rice was subjected to the nutrition enriching process.

The example 8 was obtained by soaking dried unhulled rice as a starting material at a water temperature of 1 to 5° C. for 40 hours as the low-temperature soaking process so as to increase the average moisture content thereof to 23% by weight. The content of gamma aminobutyric acid of the example 8 was 12.9 mg/100 g.

The example 9 was obtained by soaking dried unhulled rice as a starting material at a water temperature of 45° C. for 300 minutes (5 hours) as the high-temperature process so as to increase the average moisture content thereof to 26% by weight. The content of gamma aminobutyric acid of the example 9 was 15.1 mg/100 g.

The example 10 was obtained by soaking dried unhulled rice as a starting material at a water temperature of substantially 5° C. for 27 hours, and then, soaking at a water temperature of 50° C. for 30 minutes as the gradual soaking process so as to increase the average moisture content thereof to 23% by weight. The content of gamma aminobutyric acid of the example 10 was 12.8 mg/100 g. The example 11 was obtained by soaking dried unhulled rice as a starting material at a water temperature of substantially 7° C. for 18 hours, and then, soaking at a water temperature of 45° C. for 120 minutes so as to increase the average moisture content thereof to 25% by weight. The content of gamma aminobutyric acid of the example 11 was 14.0 mg/100 g.

The gamma aminobutyric acid of each of the examples 8 to 11 was enriched to 12 mg/100 g or higher. Therefore, it could be observed that the low-temperature soaking process, the high-temperature soaking process, and the gradual soaking process were effective as a hydration process according to the invention.

TABLE 8

| SAMPLE | SOAKING CONDITION | AVERAGE MOISTURE CONTENT (wt %) | GAMMA AMINOBUTYRIC ACID (mg/100 g) |
|---|---|---|---|
| EXAMPLE 8 | LOW-TEMPERATURE SOAKING | 23 | 12.9 |
| EXAMPLE 9 | HIGH-TEMPERATURE SOAKING | 26 | 15.1 |
| EXAMPLE 10 | GRADUAL SOAKING | 23 | 12.8 |
| EXAMPLE 11 | GRADUAL SOAKING | 25 | 14.0 |

In the experiment 9, an effect of enrichment of gamma aminobutyric acid in a case where not a microwave heating device but a far infrared ray heating device is used as means for heating unhulled rice in the nutrition enriching process was examined. In the experiment 9, raw unhulled rice of which average moisture content was 26% by weight was used as a starting material and the far infrared ray heater sold in market was used as the heating means. The processing temperature in the nutrition enriching process was 62° C. and the processing time was 20 minutes. As a result of the experiment 9, the content of gamma aminobutyric acid of a sample could be enriched to 11.7 mg/100 g.

In the experiment 10, an effect of enrichment of gamma aminobutyric acid in a case where not Koshihikari as non-waxy rice but raw unhulled rice of glutinous rice produced on 2008 was used was examined. The average moisture content of the starting material was 25% by weight, the processing temperature in the nutrition enriching process was 62° C., and the processing time was 60 minutes. As a result of the experiment 10, the content of gamma aminobutyric acid of a sample could be enriched to 17.3 mg/100 g also in the glutinous rice.

Next, an experiment 11 is described with reference to Table 9 and FIG. 5. In the experiment 11, dried unhulled rice of which average moisture content was 14.5% by weight was used as a starting material and a relationship between a soaking time and an average moisture content thereof in a case where the dried unhulled rice was soaked in water at 2 to 6° C. was examined. As a result of the experiment 11, it was found that in the soaking at a water temperature corresponding to the low-temperature soaking process according to the invention, a soaking time of 15 hours or longer was required for increasing the average moisture content of the dried unhulled rice to 20% by weight or higher.

TABLE 9

| SOAKING TIME (min) | AVERAGE MOISTURE CONTENT (wt %) |
|---|---|
| BEFORE SOAKING | 14.5 |
| 60 | 16.1 |
| 120 | 16.9 |
| 300 | 18.1 |
| 900 | 20.5 |
| 1200 | 21.0 |
| 1440 | 21.4 |
| 2400 | 23.2 |
| 2940 | 24.1 |

Next, an experiment 12 is described with reference to Table 10 and FIG. 6. In the experiment 12, dried unhulled rice of which average moisture content was 14.5% by weight was used as a starting material and a relationship between a soaking time and an average moisture content thereof in a case where the dried unhulled rice was soaked in water at 50° C. was examined. As a result of the experiment 12, it was found that in the soaking at a water temperature corresponding to the high-temperature soaking process according to the invention, a soaking time of 90 minutes or longer was required for increasing the average moisture content of the dried unhulled rice to 20% by weight or higher.

TABLE 10

| SOAKING TIME (min) | AVERAGE MOISTURE CONTENT (wt %) |
|---|---|
| BEFORE SOAKING | 14.5 |
| 15 | 16.8 |
| 30 | 18.0 |
| 60 | 19.6 |
| 90 | 21.3 |
| 120 | 22.6 |
| 150 | 23.2 |
| 180 | 24.3 |

As described above, the invention has been described by exemplifying a preferred embodiment. However, the invention is not limited to the embodiment. As will be described below, various modifications and changes can be made in a range without departing from a scope of the invention.

That is, according to the above embodiment, the hydration process S5 is a process of hydrating the dried unhulled rice 12 by the soaking. However, as a method of hydrating the unhulled rice as a starting material, various methods in addition to the soaking can be used. For example, water may be sprayed on the dried unhulled rice 12. Further, unhulled rice may be taken out and placed in the air after being soaked for only a short period of time so as to absorb water attached to a surface of the unhulled rice.

In addition, in the above embodiment, in the nutrition enriching process S2, the container is sealed in order to prevent the unhulled rice from being dried. However, the unhulled rice may be prevented from being dried by another method. For example, the unhulled rice may be prevented from being dried by keeping a space where the nutrition enriching process is performed to be high humidity.

Further, in the above embodiment, the dried unhulled rice 12 is made to be the high-moisture unhulled rice 22 by the hydration process S5. However, even when the raw unhulled rice 2 is used as a starting material, the hydration process S5 may be performed before the nutrition enriching process S2 (FIG. 2). For example, if the average moisture content of the raw unhulled rice 2 as a starting material is lower than a desired level, the average moisture content of the raw unhulled rice 2 can be increased in a pre-germinated state by the hydration process S5.

What is claimed is:

1. A nutrition-enriched rice manufacturing method, comprising:
   a nutrition enriching process, comprising
      heating unhulled rice to a processing temperature of 52° C. to 80° C., the unhulled rice being in a pre-germinated state in which average moisture content is 20% to 32% by weight, said heating being performed in an airtight bag, and then
   retaining said unhulled rice at the processing temperature for a period of time, that results in enriching gamma aminobutyric acid in an endosperm part of the unhulled rice, while keeping the unhulled rice in the pre-germinated state, said retaining being performed by placing said airtight bag including said unhulled rice in a tank including water at a temperature that keeps the unhulled rice at the processing temperature.

2. The nutrition-enriched rice manufacturing method according to claim 1,
   wherein the unhulled rice in the pre-germinated state is raw unhulled rice, and
   wherein an average moisture content of the raw unhulled rice is maintained at 20% to 32% by weight from harvesting up to the nutrition enriching process.

3. The nutrition-enriched rice manufacturing method according to claim 1, further comprising:
   before the nutrition enriching process, hydrating unhulled rice in the pre-germinated state by adding water to the unhulled rice in the pre-germinated state so that the unhulled rice in the pre-germinated state has an average moisture content of 20% to 32% by weight.

4. The nutrition-enriched rice manufacturing method according to claim 3, wherein the hydrating step includes at least one of (i) low-temperature soaking in which the unhulled rice in the pre-germinated state is soaked in water at 0° C. to 10° C., and (ii) high-temperature soaking in which the unhulled rice in the pre-germinated state is soaked in water at 45° C. to 52° C.

5. The nutrition-enriched rice manufacturing method according to claim 4, wherein each of the low-temperature soaking and the high-temperature soaking is executed at least one time during the hydrating step.

* * * * *